United States Patent [19]

Hodgins

[11] 3,970,900

[45] July 20, 1976

[54] OVERVOLTAGE PROTECTION FOR AN INTEGRATED CIRCUIT

[75] Inventor: Robert G. Hodgins, Canastota, N.Y.

[73] Assignee: General Electric Company, Carmel, Ind.

[22] Filed: Dec. 19, 1974

[21] Appl. No.: 534,650

[52] U.S. Cl. .............................. 317/31; 317/33 R; 323/4
[51] Int. Cl.² ......................................... H02H 3/28
[58] Field of Search ............. 317/31, 33 R, 33 VR; 323/22 Z, 4, 1

[56] References Cited
UNITED STATES PATENTS

| | | | |
|---|---|---|---|
| 3,303,413 | 2/1967 | Warner et al. | 323/22 Z |
| 3,629,819 | 12/1971 | Peterson | 323/22 Z |

Primary Examiner—Harry Moose

[57] ABSTRACT

A pass transistor is coupled serially with an integrated circuit across a DC energy source. The DC source includes a battery coupled in parallel with a charging transformer output and a diode, the negative side being connected to ground. A resistor is coupled across the pass transistor collector and base to assure conduction by the pass transistor when the DC source is operative. A string of zener diodes is connected between the pass transistor base and ground to provide voltage limiting by clamping the transistor base during an overvoltage condition arising, for example, when the battery has a defective cell or an open connection to the remainder of the circuit. Such an arrangement allows reliable operation with monolithic transistors having about 27 volts collector to emitter breakdown voltage rating.

6 Claims, 1 Drawing Figure

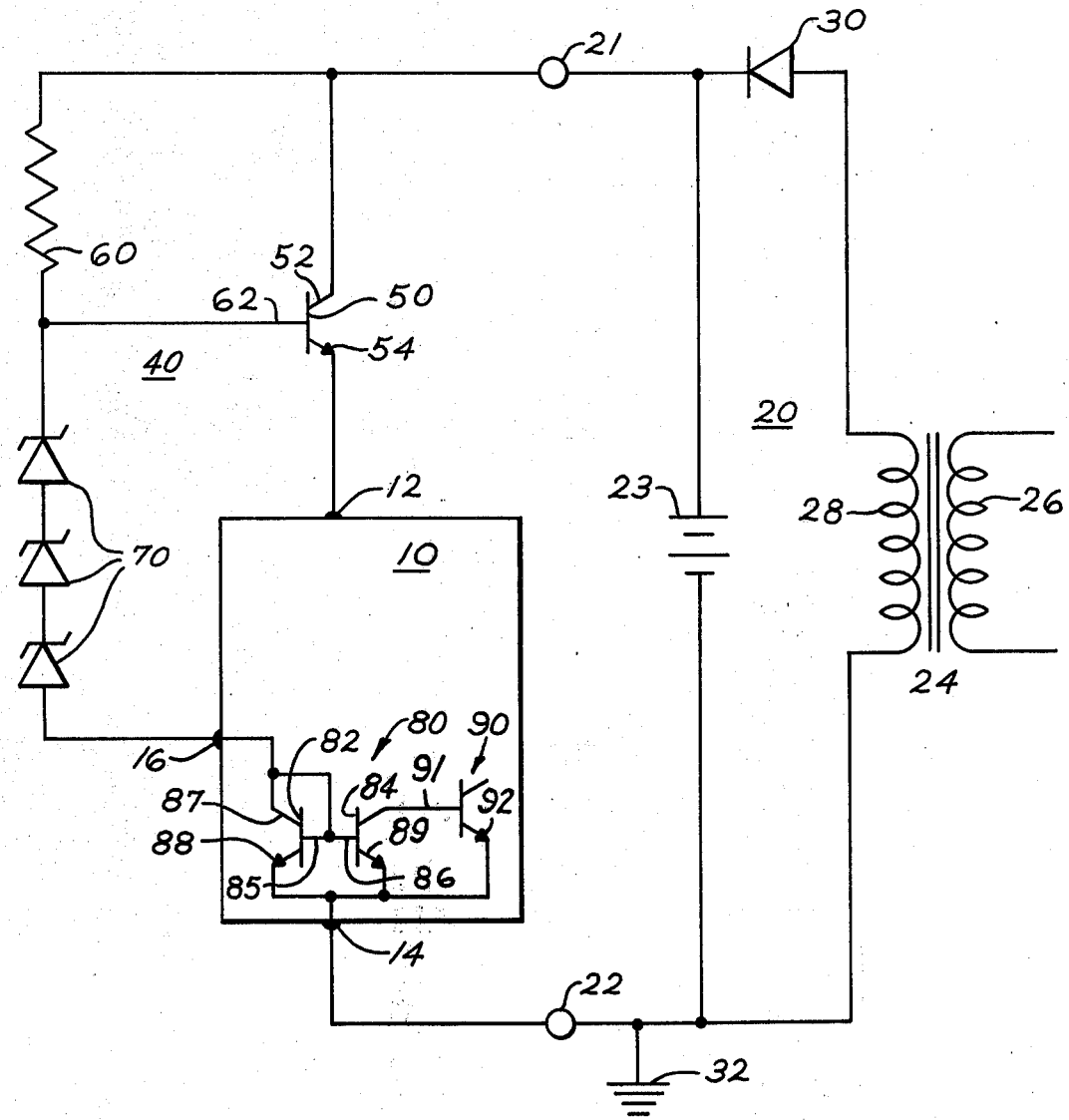

OVERVOLTAGE PROTECTION FOR AN INTEGRATED CIRCUIT

BACKGROUND OF THE INVENTION

1. Field of the Invention

The present invention relates to over-voltage protection and particularly to a monolithic integrated circuit having such over-voltage protection means.

2. Description of the Prior Art

The normal collector to emitter breakdown voltage for NPN transistors fabricated by conventional integrated circuit technology is about 30 volts. There are occasions however in circuits employing such integrated circuits that an overvoltage fault condition arises. This may happen when a DC energy such as a battery cannot accept charging current due to a defective cell or open connection in which case the voltage applied to the integrated circuit will rise to a point which is the peak of the AC wave generated by the battery charging means, normally a 60 Hz transformer. The transformer winding may have an open circuit peak voltage approaching 50 volts.

It is desirable therefore to provide overvoltage protection means which can extend the safe operating voltage applied to an integrated circuit from about 30 to about 50 volts.

Accordingly, it is an object of the present invention to provide an over-voltage protection means for a monolithic integrated circuit.

SUMMARY OF THE INVENTION

In accordance with the present invention, there is provided overvoltage protection means for a monolithic integrated circuit. Included is a pass transistor having a collector and an emitter connected serially with the integrated circuit across a DC energy source. A current source provides continuous base drive for the pass transistor when the DC source is operative for assuring conduction of the transistor to energize the integrated circuit. In a non-voltage condition, when the DC source voltage is below a predetermined value, low power dissipation in the circuit is preserved by allowing only a low voltage drop across the current source and the transistor base emitter. Included also is voltage limiting means for clamping the transistor base during an overvoltage condition when the DC source voltage is at or above the predetermined value, this serving to protect the integrated circuit from high voltage breakdown.

BRIEF DESCRIPTION OF THE DRAWINGS

The accompanying drawing is a schematic representation of the preferred embodiment of the overvoltage protection means of the present invention.

DESCRIPTION OF THE PREFERRED EMBODIMENT

Referring now to the drawing, there is shown an integrated circuit 10 shown in block form. Integrated circuit 10 has a pair of input pins 12 and 14 for coupling to a DC source, and a third input pin 16. A DC energy source 20 provides power to energize integrated circuit 10 and includes a positive output terminal 21, a negative output terminal 22, a battery 23 and charging means therefor in the form of a transformer 24. Transformer 24 includes a primary winding 26 adapted for coupling to a 120 V, 60 Hz source. A secondary winding 28 is coupled serially with a diode 30 across battery 23 to provide charging current. The negative side of the battery 23 is coupled to ground at 32.

In accordance with the present invention, there is provided overvoltage protection means 40 for monolithic integrated circuit 10. A pass transistor 50 has a collector 52 and an emitter 54 connected serially with integrated circuit 10 across the DC energy source through terminals 21 and 22. A current source, which in the preferred embodiment takes the form of a resistor 60 electrically connected between the collector 52 and a base 62 of pass transistor 50, provides continuous base drive for the pass transistor when DC source 20 is operative for assuring conduction of the transistor to energize integrated circuit 10.

Voltage limiting means are provided, which in the preferred embodiment, takes the form of a string of zener diodes 70 connected serially between transistor base 62 and the ground side of DC source 20 through IC input pin 16. Zener diodes 70 serve to clamp the transistor base during an overvoltage condition when the DC source voltage is at or above a predetermined value and serves to protect the integrated circuit 10 from high voltage breakdown.

Coupled serially between the zener diodes 70 and ground is a switch 80 in the form of a pair of NPN transistors 82 and 84 formed as a part of integrated circuit 10 and having their respective bases 85 and 86 electrically connected together, the collector 87 of transistor 82 being shorted to the base thereof. The emitters 88 and 89 respectively are connected to ground. Another transistor 90 has its base 91 connected to the collector of transistor 84 and an emitter 92 connected to ground.

A description will be given now of the operation of protection means 40. During normal operation, the voltage that is applied to the integrated circuit 10 through pins 12 and 14 is limited to the battery voltage, with the remainder of the open circuit voltage from the charging circuit being dropped across the transformer reactance.

However, in the event that battery 23 cannot accept charging current due to a defective cell or an open connection, the voltage across pins 12 and 14 of the integrated circuit might rise to a point which is the peak of the AC wave generated in winding 28 of 60 Hz transformer 24 and which may approach 50 volts. If an overvoltage condition occurs such that the voltage across pins 12 and 14 of the integrated circuit exceeds about 27 volts, the protection means of the present invention takes over to minimize the voltage stress on the various components in the integrated circuit 10. This is necessary because the normal collector to emitter breakdown voltage for NPN transistors fabricated by conventional integrated circuit technology is about 30 volts.

The zener diode string 70 begins to conduct current to limit the voltage at the base 62 of pass transistor 50 to a value of from 24.7 to 27.7 volts. The emitter 54 of transistor 50 will be at a voltage about 0.7 volt below its base voltage or from about 24 to 27 volts. It is this voltage that the remainder of the integrated circuit is subjected to during overvoltage conditions. The other 23 to 26 volts of applied fault voltage is across the collector 52 to emitter 54 of the pass transistor 50. Thus, the reliability of this system is enhanced in that electrical stresses are better distributed and the voltage withstand capability is increased from about 30 to about 50 volts.

When the zener diode string 70 begins to conduct to limit the voltage at transistor base 62, a current flows through the zener diode string 70 to be injected into transistor 82, thereby causing transistor 84 to turn on to short the base of transistor 90 to ground and thereby to its emitter. This can be a useful function in an IC in that the turning on of transistor 84 can serve to short the bases of certain other transistors in the IC to their emitters to protect those portions of the IC that may not be protected by the pass transistor arrangement. For an application of the usefulness of this function, reference is made to U.S. Pat. No. 3,921,005 Watrous, filed concurrently herewith and assigned to the same assignee as the present invention.

In the non-fault, normal battery voltage operating conditions, batteries up to about 24 volts may be used to power the integrated circuit 10 without causing any current to flow in the zener string 70. In such a non-fault case, the only voltage drop associated with this protective circuitry is the 0.7 volt base-emitter drop of transistor 50 and the drop of base current times resistor 60. For a typical emitter current of 7.5 ma., beta of 50 and resistor 60 value of 2,000 ohms, the remainder of the circuit will only be 1 volt below battery voltage for the full range thereof.

The protection means of the present invention may be included as a part of the monolithic integrated circuit 10 and in fact has been successfully built and operated in such a configuration.

It should be apparent to those skilled in the art that the embodiment described heretofore is considered to be the presently preferred form of this invention. In accordance with the Patent Statutes, changes may be made in the disclosed apparatus without departing from the true spirit and scope of this invention.

What is claimed is:

1. Overvoltage protection means for a monolithic integrated circuit comprising:

a pass transistor having a collector and an emitter connected serially with the integrated circuit across a DC energy source;

a current source for providing continuous base drive for the pass transistor when the DC source is operative for assuring conduction of the transistor to energize the integrated circuit and in a nonovervoltage condition when the DC source voltage is below a predetermined value to preserve low power dissipation in the circuit by allowing only a low-voltage drop across the current source and the transistor base-emitter;

voltage limiting means for clamping the transistor base during an overvoltage condition when the DC source voltage is at or above the predetermined value; and a switch in the integrated circuit connected serially between the voltage limiting means and the ground side of the DC source such that, upon conduction of the voltage limiting means, a current flowing therethrough serves to turn on the switch thereby to protect the integrated circuit from high voltage breakdown.

2. The protection means of claim 1 wherein the voltage limiting means is a zener diode connected serially between the transistor base and a ground side of the DC source.

3. The protection means of claim 1 wherein the switch serves to short the base of a second transistor to the ground side of the DC source and to the transistor emitter thereby increasing voltage withstand capability of the transistor.

4. The protection means of claim 1 wherein the current source is a resistance connected between the transistor base and a positive bus of the DC source.

5. The protection means of claim 1 wherein the DC energy source is a battery coupled in parallel with charging means therefor.

6. The protection means of claim 4 wherein the charging means is a transformer secondary winding connected serially with a diode.

* * * * *